United States Patent [19]
Toyama

[11] 4,437,552
[45] Mar. 20, 1984

[54] SPRING CLUTCH DEVICE

[75] Inventor: Masamichi Toyama, Tokyo, Japan

[73] Assignee: Canon Kabushiki Kaisha, Japan

[21] Appl. No.: 312,321

[22] Filed: Oct. 16, 1981

[30] Foreign Application Priority Data

Oct. 24, 1980 [JP] Japan .................................. 55-149657
Dec. 17, 1980 [JP] Japan .................................. 55-178604

[51] Int. Cl.³ .................... F16D 21/04; F16D 13/08; G03B 3/10
[52] U.S. Cl. ................. 192/26; 192/12 BA; 192/48.92; 192/81 C; 352/140
[58] Field of Search ................. 192/12 BA, 26, 48.91, 192/48.92, 81 C, 84 T; 352/140

[56] References Cited

U.S. PATENT DOCUMENTS 2,885,896  5/1959  Hungerford, Jr. et al. ... 192/48.92 X
4,278,340  7/1981  Toyama et al. ................. 352/140 X

FOREIGN PATENT DOCUMENTS 39-29129  12/1964  Japan .

Primary Examiner—Allan D. Herrmann
Attorney, Agent, or Firm—Toren, McGeady and Stanger

[57] ABSTRACT

A spring clutch which has two wrapped springs wound in different directions from each other and which is arranged to transmit the rotation of a drive source to two members to be driven by effecting change-over from one member to another. The transmission of the rotation is arranged to be immediately cut off at any desired point by operating a change-over member.

2 Claims, 11 Drawing Figures

SPRING CLUTCH DEVICE

BACKGROUND OF THE INVENTION

1. Field of the Invention

This invention relates to a spring clutch device which utilizes wrapped springs and more particularly to a spring clutch device which is capable of cutting off transmission of a driving force at a desired point.

2. Description of the Prior Art

There has been known so-called spring clutches of the type in which, for example, a coil spring is wound around the outer circumference of a driving shaft in close contact therewith with one end of the spring being attached to a driven member which is disposed concentrically with the driving shaft and being arranged to be driven thereby. In such a device, only the rotation of the driving shaft in the direction of tightening the coil of the spring by a frictional force between the driving shaft and the spring is transmitted to the member to be driven. The rotation of the driving shaft in the reverse direction, i.e. a direction in which the inner diameter of the spring coil is widened, is arranged not to be transmitted to the member to be driven.

Further, there has been also known a spring clutch having a change-over lever for effecting change-over between a condition wherein the rotation of a driving shaft is transmitted in one direction and a condition wherein the rotation is not transmitted. In such a device, a projection is provided at one end of a spring of the above stated type and a change-over lever is arranged to be engaged with the projection. In a conventional spring clutch of this type, transmission of rotation of the driving shaft is arranged to be cut off when the change-over lever engages the projection.

A spring clutch arranged in this manner has the advantage that the change-over operation of the clutch can be accomplished very simply by operation of the change-over lever. On the other hand, however, release from the clutch transmission state is allowed to be effected only once per rotation of the shaft of the clutch. In other words, it is impossible to cut off the clutch at any desired phase of rotation thereof.

SUMMARY OF THE INVENTION

It is therefore an object of the invention to provide a spring clutch which eliminates the above stated shortcoming of the conventional spring clutch and which is capable of cutting off the transmission of rotation of a driving shaft immediately in response to an operation on a change-over lever.

It is another object of the invention to provide an improved spring clutch device which when used in a motion picture camera having a shutter, a film feeding mechanism and a focusing mechanism arranged to be driven by one common driving motor through a spring clutch of the above stated type, effectively prevents the focusing mechanism from acting during the process of exposure for the last frame of a photographing operation when the camera is stopped.

These and further objects, features and advantages of the invention will become apparent from the following detailed description of embodiments thereof taken in connection with the accompanying drawings.

DETAILED DESCRIPTION OF PREFERRED EMBODIMENTS

Figure 1:
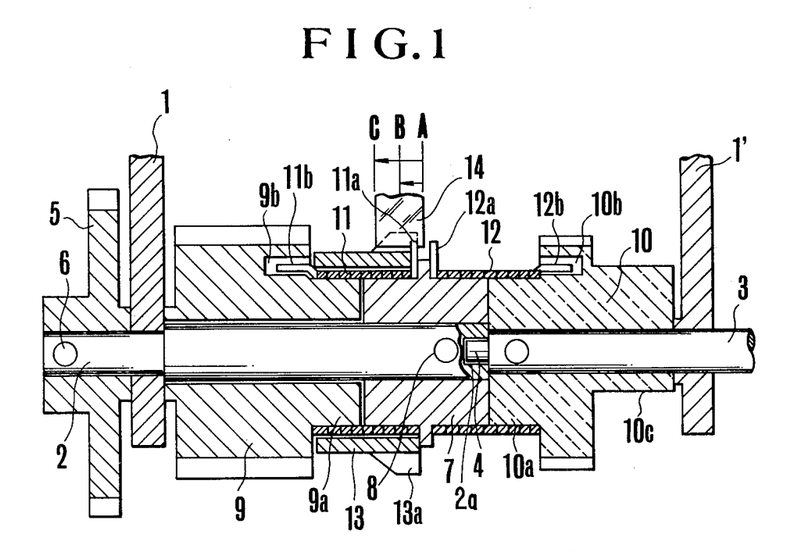
FIG. 1 is a sectional view showing the clutch device of the invention in an embodiment thereof.
Figures 2, 3:
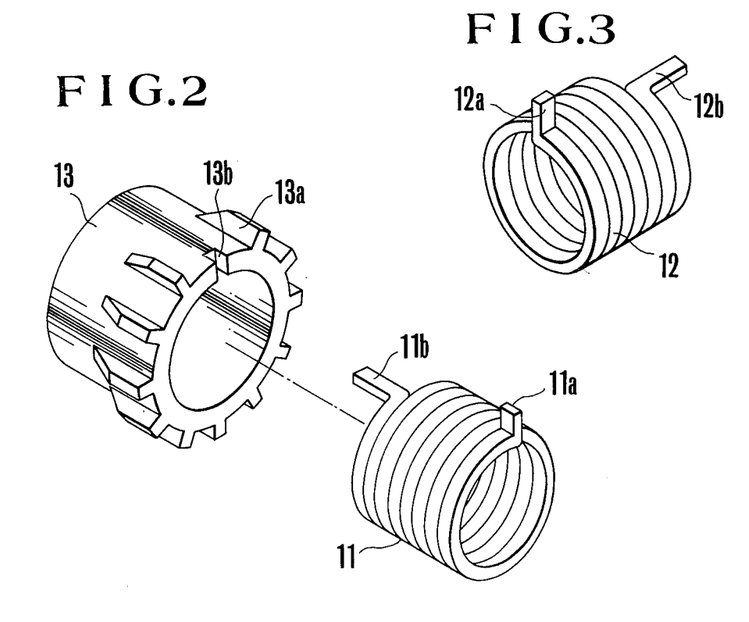
FIGS. 2 and 3 are oblique views showing components of the clutch device shown in FIG. 1.

A first embodiment of the invention as shown in FIG. 1 comprises a clutch provided with an input shaft 2 and an output shaft 3 which are supported by bearing plates 1 and 1' respectively. The input shaft 2 has a hole 2a formed in the end face thereof while the output shaft 3 has a projection 4 formed on the end face thereof. The input and output shafts 2 and 3 are kept in a coaxial relationship relative to each other with the projection fitted in the above stated hole 2a of the output shaft 2. However, the rotation of the input shaft 2 is not directly transmitted to the output shaft 3. Secured to the outer end of the input shaft 2 by a pin 6 is an input gear 5. Meanwhile, a collar 7 of the clutch is fixedly attached to the inner end of the input shaft 2. Between the collar 7 and one of the bearing plates 1, there is provided a worm gear 9 which is loosely fitted. Further, between the collar 7 and the other bearing plate 1', there is provided a pulley 10 which is secured to the output shaft 3. A first wrapped spring 11 which is shown in detailed in FIG. 2 is wound around a ring part 9a of the worm gear 9 and the collar 7 extending partially over both of them. Meanwhile, a second wrapped spring 12 which is shown in detail in FIG. 3 is wound around a ring part 10a of the pulley 10 and the collar 7 also extending partially over both of them. The winding direction of the spring 11 and that of the spring 12 are contrary to each other. They are in frictional contact with the collar 7 at their inner end portions. At the inner end of the spring 11, there is formed a bent up part 11a while a bent part 11b is formed at the outer end thereof. The bent part 11b is inserted in a hole 9b provided in the worm gear 9. The other spring 12 is also provided with a bent up part 12a which is formed at the inner end of the spring 12 and a bent part 12b which is formed at the outer end thereof. This bent part 12b is inserted in a hole 10b provided in the pulley 10. When the input shaft 2 is rotated through the input gear 5 in one direction, or counterclockwise as viewed from the left side in the case of FIG. 1, the coils of both springs 11 and 12 are wound tighter. Then, the rotation of the input shaft 2 is transmitted to both the worm gear 9 and the pulley 10. Following this, when the inner end of the spring 11 is stopped, the tighter winding of the spring 11 is released to block the rotation transmission to the worm gear 9. When the inner end of the second spring 12 is stopped, the spring 12 is released from the tighter winding and the rotation transmission to the pulley 10 is blocked.

As described in the foregoing, the clutch device shown in FIG. 1 has one rotation input and two rotation outputs. The transmission of a rotating force to the two rotation outputs is controllable by selecting coil tightening and coil loosening operations on the two coil contracting springs 11 and 12 which are wound in different directions from each other. In this illustrated case, the worm gear 9 represents a first rotation output while the pulley and the output shaft 3 jointly represent a second rotation output. Further, in this particular embodiment, a cam 10c which will be further described later is formed into one unified body with the pulley 10.

On the spring 11, there is provided a stop ring 13 which is loosely fitted on the spring 11. As shown in FIG. 2, this stop ring 13 has at least one fin 13a and one slit 13b disposed on the outer periphery of the stop ring 13. This slit 13b is arranged to have the above stated bent up part 11a of the spring 11 engaged therewith. Meanwhile, the engagement and disengagement of the fin 13a of the stop ring 13 and the bent up part 12a of the second spring 12 are controlled by a clutch change-over member 14. The clutch change-over member 14 is shiftable between positions A, B and C indicated in FIG. 1. When the change-over member 14 is in the position A thereof, the second spring 12 is released from a spring coil tightening force and the rotating force is transmitted solely to the first output side. When the member 14 is in the position B, both the first and second springs 11 and 12 are released from coil tightening forces and the rotating force is blocked from being transmitted to both output sides. With the member 14 in the position C, the first spring 11 is released from the coil tightening force and the rotating force is transmitted solely to the second output side.

Figures 4, 5:
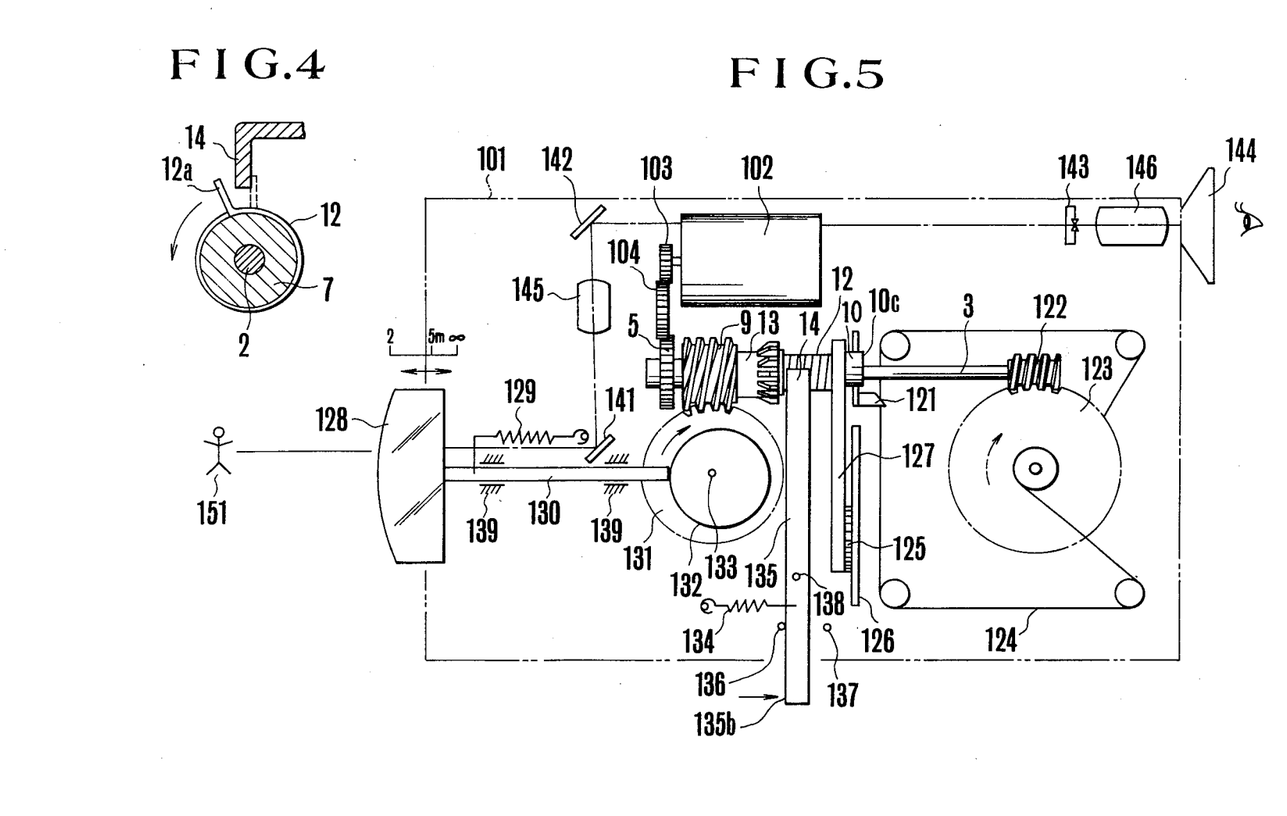
FIG. 4 is a sectional illustration of the operation of the clutch device.
FIG. 5 is a schematic view of the clutch device of FIG. 1 as applied to a motion picture camera.

FIG. 5 shows an embodiment wherein a clutch device as described in the foregoing is applied to a motion picture camera.

Referrring now to FIG. 5, a motion picture camera 101 uses the clutch in accordance with the present invention. The camera comprises: a driving motor 102; a motor gear 103; an idle gear 104; the input gear 5 previously mentioned; the worm gear 9; the film feeding cam 10c which is formed into one unified body with the pulley; a film take up shaft 3 which is formed into one unified body with the pulley 10; a film feeding claw 121; a worm gear 122; a film take up gear 123; an 8 mm film 124 which is contained in a cartridge which is not shown; a shutter pulley 125 which is arranged into one unified body with a rotary shutter 126; a belt 127 stretched between the pulley 10 and the shutter pulley 125; a photo taking lens 128; an interlocking bar 130 which is secured to a lens barrel (not shown) of the focusing lens 128 (or photo taking lens) and is carried by a fixed guide 139; a worm wheel 131 which engages the worm gear 9 and is arranged to be rotatable on a shaft 133; a focus cam 132 for controlling the extent of screwing out movement of the focusing lens 128; a spring 129 which presses the interlocking bar 130 into contact with the focus cam 132; and a clutch lever 135 which is arranged to be capable of swaying on a shaft 138 and is pressed against a stopper 136 by a spring 134. With the clutch lever 135 thus pressed against the stopper 136 by the spring 134, a clutch change-over part 14 which is provided at a bent part formed at the fore end of the lever is abutting upon the bent up part 12a of the second spring 12. The camera is provided with an operation part 135b which permits operation of the camera from outside. A light incident upon the photo taking lens is guided to a view finder by a first mirror 141 and a second mirror 142. The camera further includes a split prism 143, and eyepiece hood 144, an objective lens 145 for the view finder and a view finder eyepiece 146. The reference numeral 151 represents an object to be photographed.

In the case of the camera shown in FIG. 5, the focusing lens 128 is moved by the first output of the clutch for focusing adjustment. Then, a photographing operation is carried out on an 8 mm film by the second output of the clutch. When the driving motor is caused to rotate under the condition illustrated in FIG. 5, the focus cam 132 is rotated in the direction of an arrow shown in the drawing by the above stated clutch action to cause in turn the lens 128 to rotate in the direction of an optical axis. The rightward movement of the lens as shown in the drawing focuses it on an object located at a longer distance. The leftward movement of the lens brings an object located at a shorter distance into focus. When the object 151 is observed through the view finder while the focus cam is rotating, upper and lower split images obtained by the action of the split prism 143 come to coincide with each other at the time of an in-focus condition and come to deviate from each other at the time of an out-of-focus condition. Then, if the operation part 135b is pushed in the direction of the arrow when the upper and lower images coincide with each other, the clutch lever 135 rotates counterclockwise until it comes to abut upon the stopper 137. The change-over part 135a of the clutch lever 135 stops the stop ring 13 by engaging either with one of the fins 13a of the stop ring 13 or with the bent up part 11a to immediately bring the focus cam to a stop. Thus, the focusing lens 128 is fixed in an in-focus position. Concurrently with this, the second coil contracting spring 12 is released from its locked state to allow the output pulley 10 to begin to rotate. This in turn causes the film feeding claw 121 and the rotary shutter 126 to commence their actions. The film is wound up in the direction of the arrow by the take-up gear and a photographing operation is carried out. When the operation part 135b is released from the pushing operation performed thereon, the clutch lever is brought back into its original position by the spring 34. Again the second coil contracting spring 12 is locked. The feeding claw 121 and the rotary shutter 126 come to a stop. The shutter 126 is arranged to stop in this instance in a position to protect the film from being exposed to light. The camera may be arranged such that, after the shutter has come to a stop, power supply to the driving motor is cut off.

Again referring to the embodiment shown in FIG. 1, the embodiment is shown in a state wherein the clutch change-over member 14 of the clutch lever has shifted into the position C and thus has been inserted in between the fins 13a of the stop ring 13 to stop the worm gear 9 from rotating. Since the bent up part 12a of the spring 12 is not locked under this condition, the spring 12 is wound tighter as the collar 7 rotates and thus comes to rotate together with the collar 7. Therefore, the pulley 10 is rotating under this condition. Then, when the clutch lever comes back to the position A, if the bent up part 12a is in a position as shown by a dotted line in FIG. 4, the pulley 10 is immediately stopped from rotating. However, if the bent up part 12a is in a position as shown by a full line in FIG. 4, the pulley 10 must rotate almost one turn until it comes to abut upon the change-over member 14 before it comes to a stop. On the other hand, the stop ring 13 is released from a locking position when the clutch lever 135 comes back to the position A and then the worm gear 9 will rotate. In other words, while the pulley 10 is rotating almost one turn, the worm gear 9 is also rotating. More specifically, in a case where the clutch lever comes back to the position A shown in FIG. 1 at the instant when the bent up part 12a of the second spring 12 is in the position shown by the full line in FIG. 4, the worm gear and the pulley 10 are rotating together. Now, in the case of the motion picture camera shown in FIG. 5, one frame portion of the film is exposed and forwarded while the pulley makes one turn. Further, when the worm gear rotates, the focus cam 132 is rotated through the worm wheel. Therefore, the focusing lens 128 is caused to move and the focusing position of the lens also varies accordingly. Thus, while the shutter come to a stop after the pulley rotates almost one turn, exposure of one frame portion of the film is performed with the photo taking lens which is in an out-of-focus condition. This presents a problem.

Figure 6:
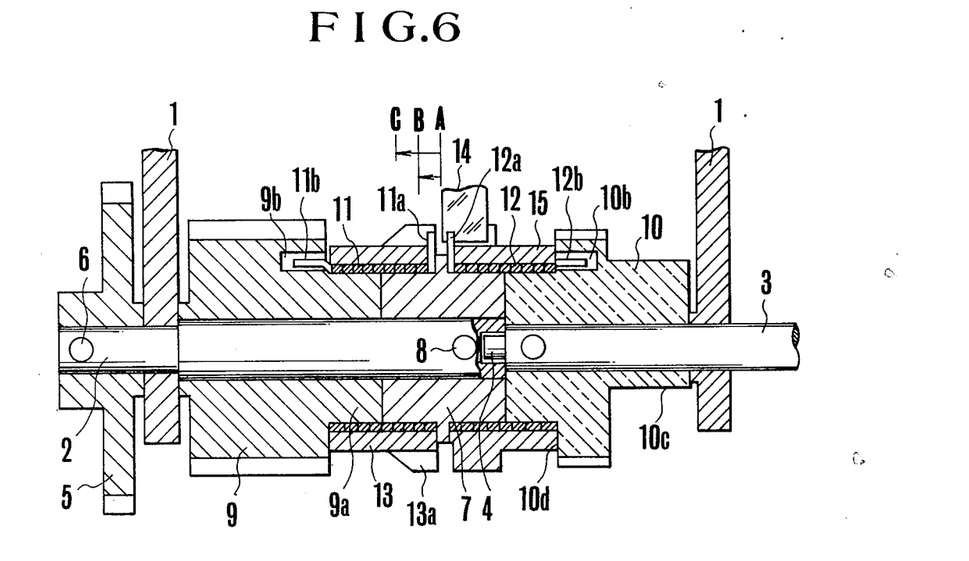
FIG. 6 is a sectional view showing the clutch device of the invention in a second embodiment thereof.
Figure 7:
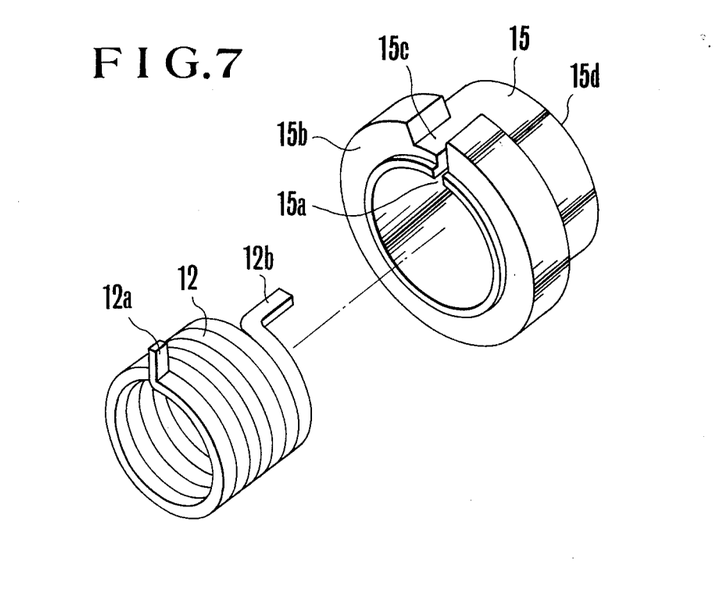
FIG. 7 is an oblique view showing components constituting the clutch device shown in FIG. 6.
Figure 8:
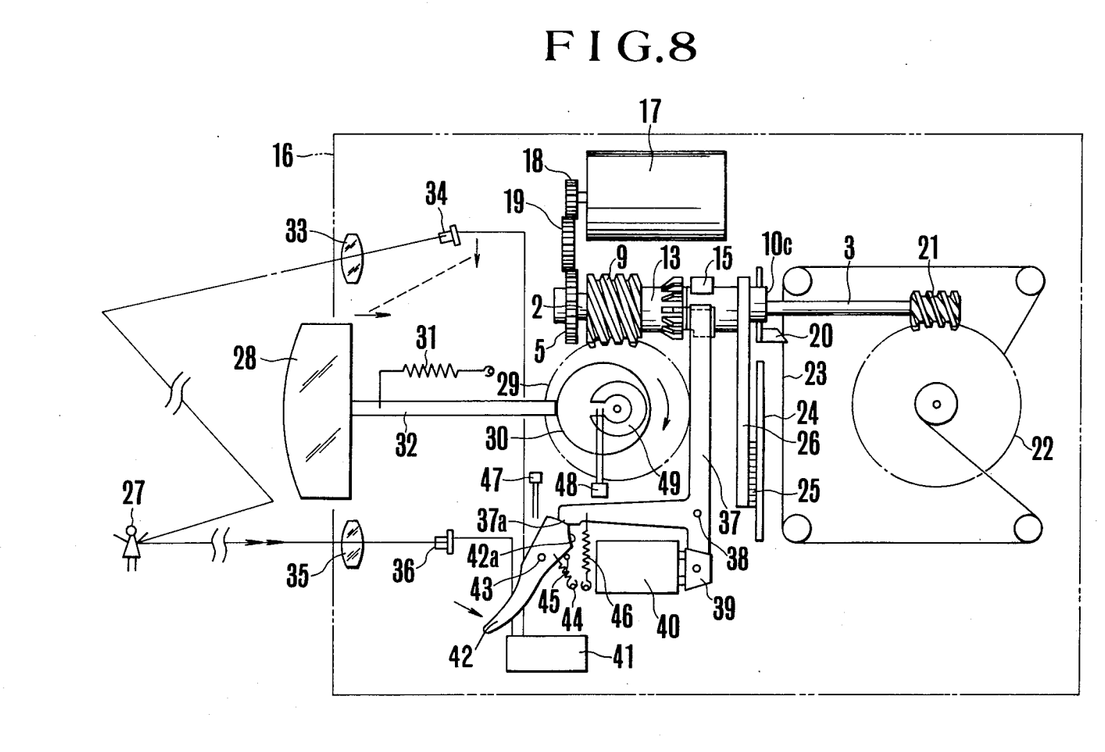
FIG. 8 is a schematic view showing the clutch device of FIG. 6 as applied to a motion picture camera.

The above stated problem which arises during a clutch change-over operation is solved by the embodiment which is shown in FIGS. 6 through 8. In this case, there is provided a means for retaining the change-over member in a state engaging one of the two springs until it comes to cut off rotation transmission to the other spring (the spring 12 in the case of this embodiment) by coming into engagement therewith. This arrangement effectively prevents the two springs from simultaneously coming into a state of transmitting the rotation.

In FIG. 6 which shows the clutch device, the same members as those shown in FIG. 1 are indicated by the same reference numberals as in FIG. 1 and they are omitted from the detailed description of the clutch device given below:

The above stated engagement retaining means for retaining the change-over member in engagement with one spring is composed of a retaining ring 15 shown in FIG. 7. This retaining ring 15 is arranged to be loosely fitted on the outer circumference of the spring 12 and is provided with a groove 15a for allowing the bent up part 12a of the spring to be inserted therein. The retaining ring 15 is provided with an abutting face 15b which is arranged to have the clutch change-over member 14 abut thereon and also with a notch 15c which is arranged to have the clutch change-over member 14 inserted therein.

Referring to FIG. 6, when the clutch change-over member 14 of the clutch lever is in the position A as shown in the drawing, the rotation of the input gear 5 is transmitted to the worm gear 9. The rotation is not transmitted with the change-over member in the neutral position B. When the change-over member is in the position C, the pulley 10 rotates. When the clutch lever is urged by means such as a spring to bring the clutch change-over member 14 back to the position A from the position C, the clutch change-over member 14 of the clutch lever comes to abut upon the abutting face 15b of the retaining ring 15. At this moment, the change-over member 14 is still in engagement with the fin 13a of the stop ring 13. When, the notch 15c comes to the position of the change-over member 14 with the retaining ring 15 further rotated, the change-over member 14 moves to the position A as shown in FIG. 5. The retaining ring 15 is locked by this and the clutch spring 12 is released from a coil tightening force exerted thereon. Accordingly, the pulley 10 is stopped thereby from rotating. On the other hand, since the stop ring 13 is then released from a locked state, the worm gear 9 begins to rotate at this point of time.

An example of applying this clutch device to a motion picture camera is as shown in FIG. 8. In this figure, parts similar to those shown in FIG. 5 are indicated by the same reference numerals as in FIG. 5.

Referring now to FIG. 8, the motion picture camera 16 which uses the clutch device according to the invention comprises: a driving motor 17; a motor gear 18; an idle gear 19; a film feeding claw 20 arranged to be actuated by a film feeding cam 10c which is arranged into one unified body with the pulley 10 of the clutch device; a worm 21 fixedly attached to the output shaft 3 of the clutch device; a take-up or winding gear 22 which is provided with a take-up claw (not shown) and is arranged to engage the above stated worm 21; an 8 mm film 23 contained in a cartridge which is not shown; a rotary shutter 24; a shutter pulley 25 which is in one unified body with the rotary shutter 24; a belt 26 stretched between the pulley 10 of the clutch device and the shutter pulley 25; an object 27 to be photographed; a focusing lens 28; a worm wheel 29 which is arranged to engage the above stated worm gear 9 of the clutch device; a focusing cam 30 which is arranged into one unified body with the worm wheel 29; a spring 31; an interlocking bar 32 which is pressed against the focusing cam 30 by the spring 31 and is thus arranged to interlock the above stated lens with the focusing cam 30; a light projection lens 33 arranged to cooperate with a light emitting element 34 provided for distance measurement; a light receiving lens 35 arranged to cooperate with a light receiving element 36 provided also for distance measurement; and a clutch lever 37 arranged to swing on a shaft 38. This clutch lever 37 is provided with the above stated clutch change-over member 14 which is disposed at the upper end of the clutch lever and also with an armature 39 which is disposed at the lower end of the lever 37 and is arranged to cooperate with a combination magnet 40 composed of a combination of a permanent magnet and a winding. The camera further includes a focus detection circuit 41; a release lever 42; a swinging shaft 43 of the lever 42; a release return spring 44; a stopper 45 for the release lever; a return spring 46 for the clutch lever; a release switch 47; a holding switch 48; and an electrical conduction part 49 formed on the focusing cam 30.

The camera arranged as described in the foregoing operates in the following manner: Again referring to FIG. 8, when the release lever 42 is pushed against the force of the spring 44, the release lever 42 swings leftward to close the release switch 47. Concurrrently with this, the cam part 42a of the release lever 42 comes to face the interlocking part 37a of the clutch lever 37 to permit the clutch lever 37 to turn leftwards. Meanwhile, however, the permanent magnet within the combination magnet 40 keeps the clutch lever 37 in the position shown in FIG. 8 (i.e. in the position A as shown in FIG. 6). With the switch closed, the focus detection circuit 41 and the motor 17 receive a power supply from a power source which is not shown. The rotation of the motor 17 is transmitted to the worm gear 9 to cause in turn the worm wheel 29 to rotate rightwards. The cam lift of the focusing cam 30 which is in one unified body with the worm wheel 29 then decreases. Therefore, the lens 28 is screwed inwards while being kept in contact with the cam by the spring 31. The light emitting element 34 which begins to emit a light about the same time as the power supply to the focus detection circuit 41 is then moved in the direction of the arrow by an interlocking mechanism which is not shown. The instant a light flux from the light emitting element 34 passes through the object 27 to be photographed, the light receiving element 36 detects reflected light thus obtained. With the reflected light detected, the focus detection circuit impresses pulses of about 40 m sec on the winding of the magnet 40. During the impression of the pulses, since the magnetic force of the permanent magnet is offset by a magnetic force developed in the winding, the clutch lever 37 is pulled by the spring 46 and turns leftwards until it comes to abut on the cam 42a of the release lever. Then, the change-over member 14 also moves to the position C shown in FIG. 6 and moves between the fins of the stop ring 13. This brings the worm gear 9, the worm wheel 29 and the lens 28 to a stop. Since the change-over member pulls out of the notch 15c of the retaining ring 15 at the same time, the retaining ring is released from locking. The pulley 10 rotates. The feeding claw 20, the rotary shutter 26 and the take-up gear 22 are operated to effect film feeding and an exposure. Next, when the release lever is released from the pushing operation thereon, the spring 44 pulls the release lever backwards. If, at this time, the notch 15c of the retaining ring 15 is located at the change-over member 14 of the clutch lever 37, the clutch lever immediately comes back to the position A shown in FIG. 6. Then, the retaining ring is locked to stop the pulley from rotating and the worm wheel 29 begins to rotate. Since the film 23 is shielded from light by the shutter 26 when the notch 15c is at the change-over member of the clutch lever, the last frame of the photographing operation can be prevented from exposure to an image out of focus. Next, if the leftward swing of the change-over member 14 of the clutch lever 37 is being blocked by the abutting face 15b of the retaining ring 15, the clutch lever remains in the position C shown in FIG. 6 and the pulley 10 alone continues to rotate with worm wheel 29 remaining stationary under that condition. Then, during this period, the last frame of the film during the photographing operation is exposed to light. When the notch 15c comes to the change-over member 14 of the clutch lever, photography is ended as described in the foregoing. The shutter comes to shield the film from light and then the photo taking lens begins to move. The worm wheel rotates until the switch 8 is turned off to stop the camera from operating. While the retaining ring 15 is rotating with the change-over member 14 of the clutch lever kept in pressed contact with the abutting face of the retaining ring 15 during the above stated operation, it is important that the coil winding of the second coil contracting spring 12 must not be loosened. To meet this requirement, the coefficient of friction between the side face 15d of the retaining ring 15 and the side face 10d of the pulley 10 (see FIG. 5) must be arranged to be higher than the coefficient of friction between the change-over member 14 and the abutting face 15b.

Figure 9:
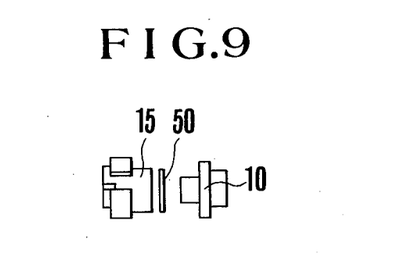
FIG. 9 is a side view showing a third embodiment of the invention.

FIG. 9 shows an example wherein the difference in the above stated coefficients of friction is increased by inserting a porous disc shaped rubber sheet 50 in between the retaining ring 15 and the pulley 10.

Figure 10:
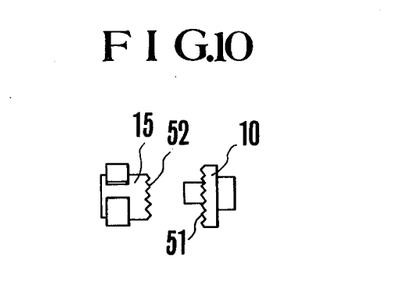
FIG. 10 is a side view showing a fourth embodiment of the invention.

FIG. 10 shows another example wherein the same purpose is attained by providing triangular slight projections on the confronting faces of the retaining ring 15 and the pulley 10. When the change-over member 14 is pressed into contact with the abutting face 15b of the retaining ring 15, the retaining ring 15 is brought into pressed contact with the pulley 10 at the same degree of pressure. In this instance, the retaining ring 15 and the pulley 10 rotate together as one unified body because they are engaged with each other by the triangular projections provided on their pressed contact faces. Accordingly, the second coil contracting spring 12 keeps on rotating without loosening. The notch 15c comes to the position of the change-over member 14 to have the change-over member 14 fall into the notch 15c. Then, there obtains the condition of A as shown in FIG. 5. This brings the rotation of the retaining ring to a stop and the spring 12 loosens to stop the pulley 10.

Figure 11:
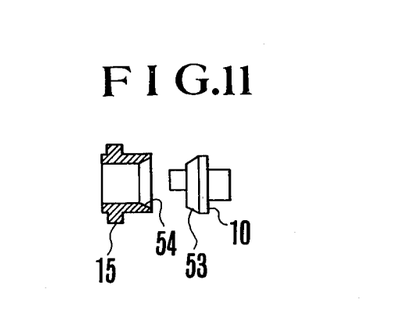
FIG. 11 is a side view showing a fifth embodiment of the invention.

For attaining the same purpose, FIG. 11 shows a further example in which the confronting faces of the retaining ring 15 and the pulley 10 are provided with tapered sides. When the change-over member 14 is pressed into contact with the abutting face 15b of the retaining ring 15, the retaining ring 15 is pressed into contact with the pulley by the same axial force that has brought the change-over member into contact. However, since the retaining ring 15 and the pulley 10 are in contact with each other through their tapered sides, a wedge effect causes them to contact with each other at surface pressure greater than the axial force to ensure that the two rotate together as one unified body. Therefore, this arrangement gives the same effect as the arrangement shown in FIG. 10.

In accordance with the present invention, in the clutch device of the type having two rotation outputs which are made available with transmission of a rotating force controlled by selecting coil tightening and coil loosening of two wrapped springs wound in different directions from each other, one of the clutch members is provided with a plurality of engaging parts arranged to engage a change-over member. This arrangement enables the clutch to be immediately cut off as described in the foregoing. The invention also permits the clutch change-over to be performed at a high degree of precision with a small change-over operation force.

Further, in accordance with the invention, there is provided the retaining means for keeping one coil contracting spring in a state engaged with the change-over member until the other wrapped spring cuts off the transmission of rotation during a change-over effecting operation. The provision of this retaining means gives a great advantage in that when the clutch device is applied to a motion picture camera arranged to use one drive source for selectively driving a focusing mechanism, a shutter and a film feeding mechanism, the focusing mechanism is never inadvertently actuated before completion of exposure of the last frame, so that the photography can be carried out with in-focus images obtained for all frames.

While specific embodiments of the invention have been shown and described in detail to illustrate the application of the inventive principles, it will be understood that the invention may be embodied otherwise without departing from such principles.

What is claimed is:

1. A spring clutch device comprising:
   a driving shaft connected to a drive source and arranged to be rotatable;
   a first driven member rotatably supported around said driving shaft;
   a second driven member supported to be concentrically rotatable on the extension of said driving shaft;
   a first wrapped spring wound into a coil like shape around the outer circumference of said driving shaft, said spring having one end thereof connected to said first driven member and being arranged to transmit the rotation of said driving shaft to said first driven member, said spring being provided with a projection formed at the other end thereof;

a second wrapped spring wound into a coil like shape around the outer circumference of said driving shaft, said spring having one end thereof connected to said second driven member and being arranged to transmit the rotation of said driving shaft to said second driven member, said spring being provided with a projection formed at the other end thereof;

said first and second wrapped springs being wound in directions opposite to each other and being spaced at a predetermined distance with their projections arranged close to each other;

a change-over member capable of entering into and retracting from the turning paths of said two springs, said change-over member being shiftable between a position in which it engages said projection of said first spring, a position in which it engages said projection of said second spring and another position in which it engages said projections of both springs, said change-over member being arranged to cut off transmission of rotation of said driving shaft to said driven members when the change-over member is in each of said engaging positions;

a ring member connected to said projection of said first spring, said ring member being provided with a plurality of engaging parts for engagement with said change-over member, said engaging parts being arranged on the outer circumference of said ring member;

spring means for urging said change-over member in the direction of engaging said second wrapped spring; and a retaining ring which is arranged to be coupled with said projection of said second wrapped spring to rotate together with said spring, said ring being provided with a slit which is arranged to engage said change-over member and with an end face for keeping said change-over member in a position engaging said projection of said first wrapped spring against said spring means until said change-over member comes to engage said slit.

2. A device according to claim 1, wherein said first driven member is coupled with focusing means of a motion picture camera; and wherein said second driven member is coupled with a shutter mechanism of said motion picture camera.

* * * * *